United States Patent

Huang

[11] Patent Number: 6,138,027
[45] Date of Patent: Oct. 24, 2000

[54] WIRELESS INTERCOMMUNICATING SYSTEM

[76] Inventor: Dennis Huang, 5F, No, Lane 9, Ningpo E. St., Taipei, Taiwan

[21] Appl. No.: 09/079,408

[22] Filed: May 15, 1998

[51] Int. Cl.[7] .................. H04Q 7/32; H04Q 7/30
[52] U.S. Cl. .................. 455/462; 455/564; 455/550; 455/561; 455/568; 455/461; 379/352; 379/355; 379/359; 379/420
[58] Field of Search ...................... 455/462, 550, 455/403, 575, 90, 564, 561, 556, 557, 465, 568, 461; 379/352, 355, 359, 420, 447

[56] References Cited

U.S. PATENT DOCUMENTS

| | | | |
|---|---|---|---|
| 4,591,661 | 5/1986 | Benedetto et al. | 455/568 |
| 4,979,205 | 12/1990 | Haraguchi et al. | 455/462 |
| 5,515,420 | 5/1996 | Urasaka et al. | 455/462 |
| 5,802,476 | 9/1998 | Nakajima et al. | 455/462 |
| 5,930,719 | 7/1999 | Babitch et al. | 455/462 |
| 5,978,689 | 11/1999 | Tuoriniemi et al. | 455/90 |
| 5,991,637 | 11/1999 | Mack, II et al. | 455/550 |

*Primary Examiner*—Fan Tsang
*Assistant Examiner*—Keith Ferguson
*Attorney, Agent, or Firm*—Bacon & Thomas, PLLC

[57] ABSTRACT

A wireless intercommunicating system includes a base unit connected to a telephone through a telephone line, and a user unit for intercommunication with the base unit by radio signal, the user unit being carried with the user and selectively controlled for use as a radio to receive the broadcasting of a radio broadcast station, or a wireless telephone.

5 Claims, 7 Drawing Sheets

WIRELESS INTERCOMMUNICATING SYSTEM

BACKGROUND OF THE INVENTION

The present invention relates to a telephone system, and more particularly to a wireless intercommunicating system which transmits messages by radio signal.

U.S. Pat. No. 5,305,370, issued to Kearns et al., discloses an automatic dialing system for use in an emergency case. This dialing system cannot be used as a telephone to receive A.F. signals (Audio Frequency Signal) by radio signal, and therefore it can only be used in an emergency case to automatically dial a particular telephone number. Further, conventional wireless telephone handsets or headphone type wireless handsets do not provide an automatic dialing function. There are known wireless handsets having an automatic dialing function, however these wireless handsets are not suitable for disabled persons, sick persons, or aged persons who cannot move freely.

SUMMARY OF THE INVENTION

It is the main object of the present invention to provide a wireless intercommunicating system that can be connected to a telephone line for use as a wireless telephone without dialer keypad, so that the user unit of the wireless intercommunicating system can be carried by the user for use as a radio, and a disabled person can use the user unit as a radio, or a mobile telephone that is capable of automatically dialing a particular telephone number when in an emergency.

According to one embodiment of the present invention, when a telephone message is received by the base unit and the user unit user is listening to the broadcasting of a radio broadcast station through the user unit, the base unit automatically cuts off the radio function of the user unit, enabling the user unit user to recognize an incoming telephone message.

DETAILED DESCRIPTION OF THE PREFERRED EMBODIMENTS

Figure 1:
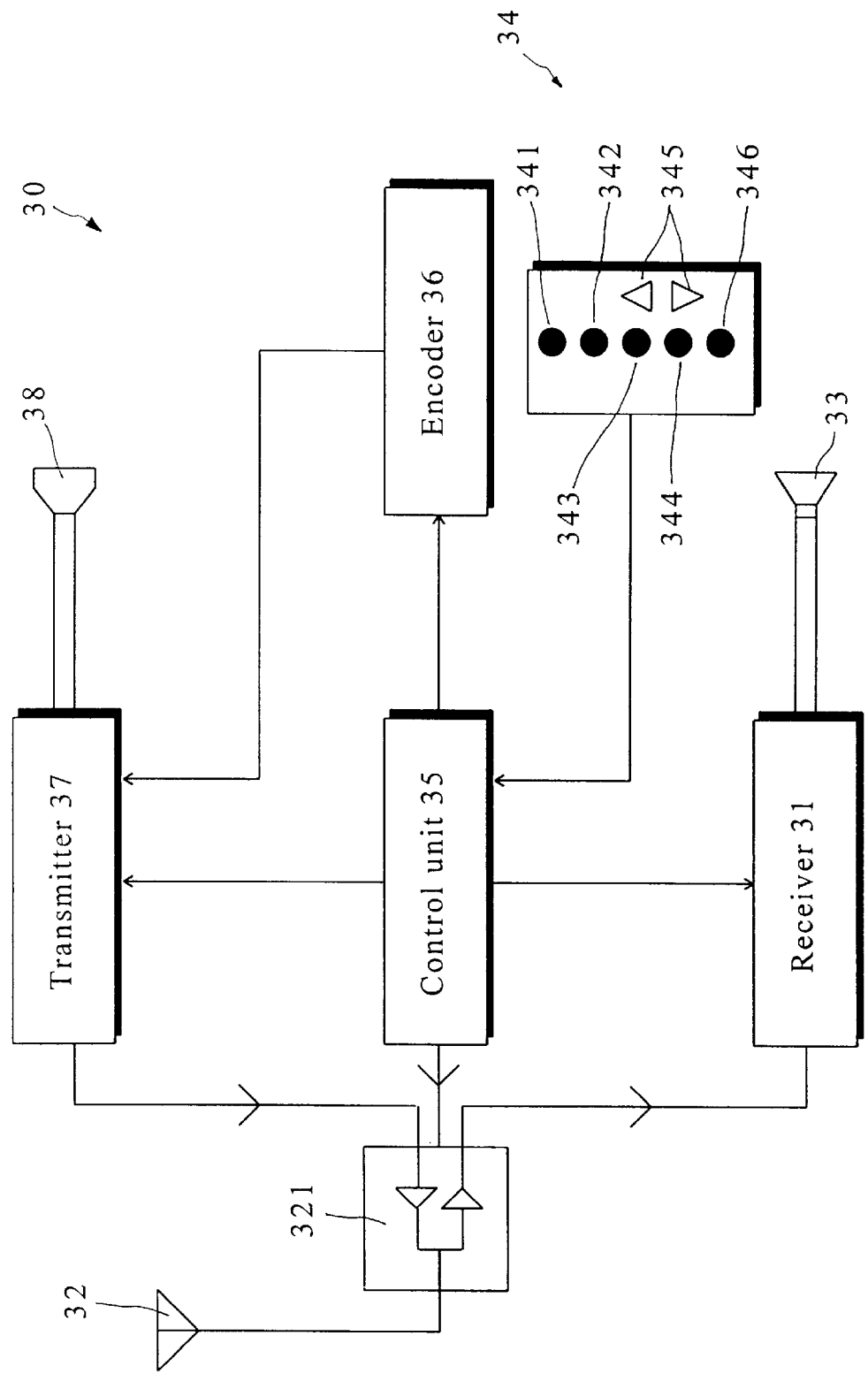
FIG. 1 illustrates the circuit architecture of a user unit for a wireless intercommunicating system according to the first embodiment of the present invention.
Figure 2:
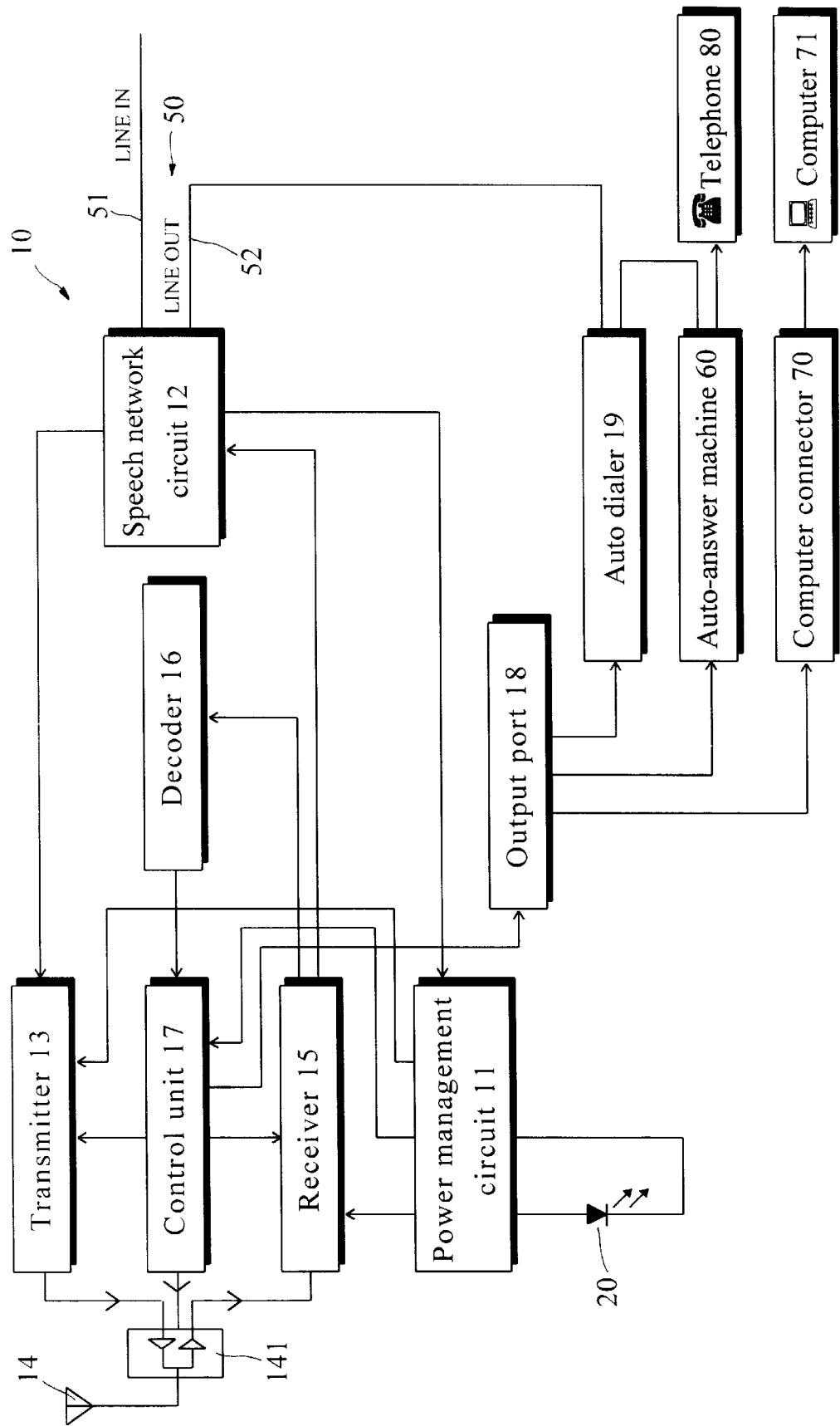
FIG. 2 illustrates the circuit architecture of a base unit for a wireless intercommunicating system according to the first embodiment of the present invention.
Figure 7:
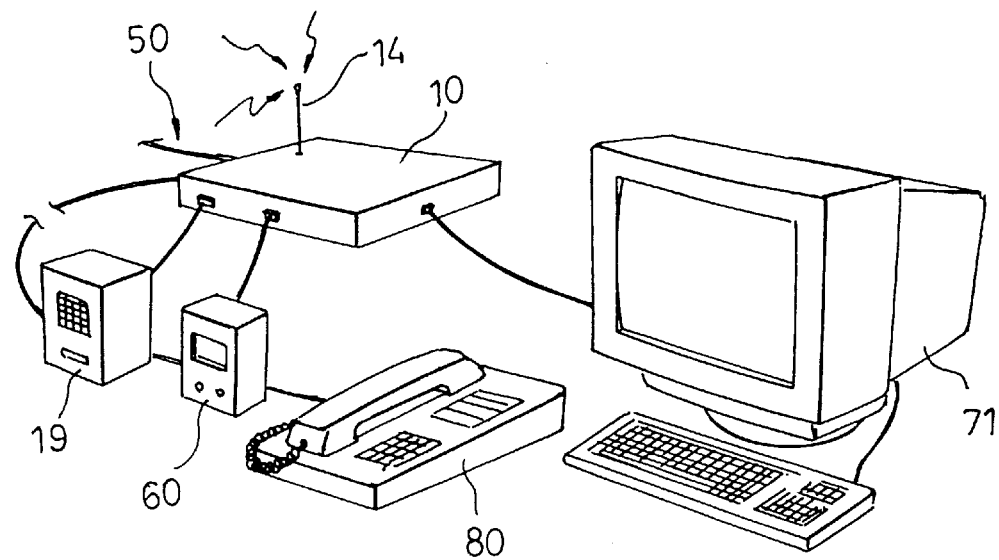
FIG. 7 is an applied view of the present invention.
Figure 7:
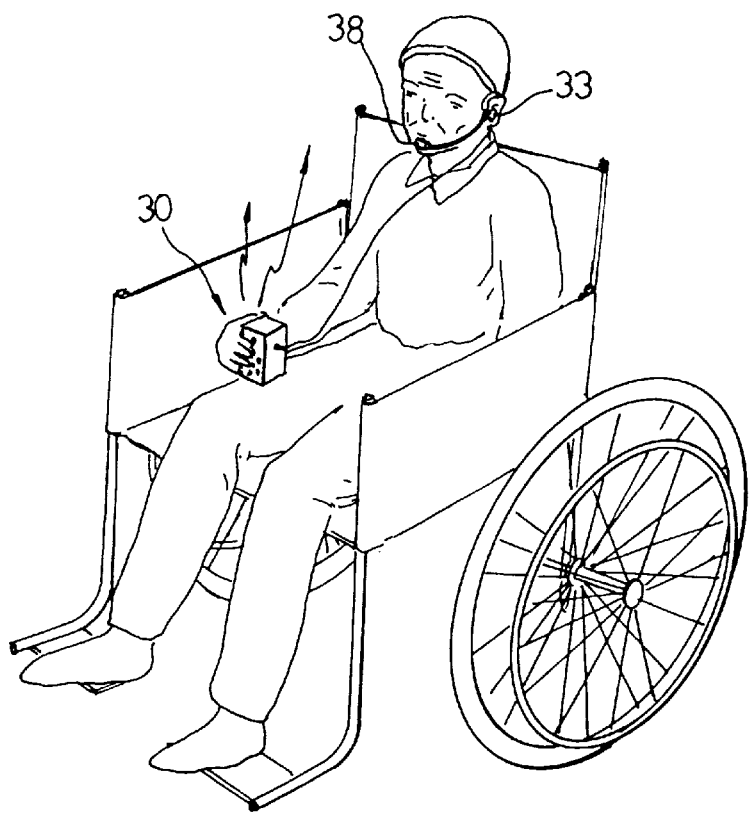

Referring to FIGS. 1, 2 and 7, a wireless intercommunicating system in accordance with a first embodiment of the present invention is generally comprised of a base unit 10, and a user unit 30. The base unit 10 can be connected to a telephone 80 by a telephone line system 50. The user unit 30 intercommunicates with the base unit 10 for transmitting message and signal to each other by radio signal.

Figure 3:
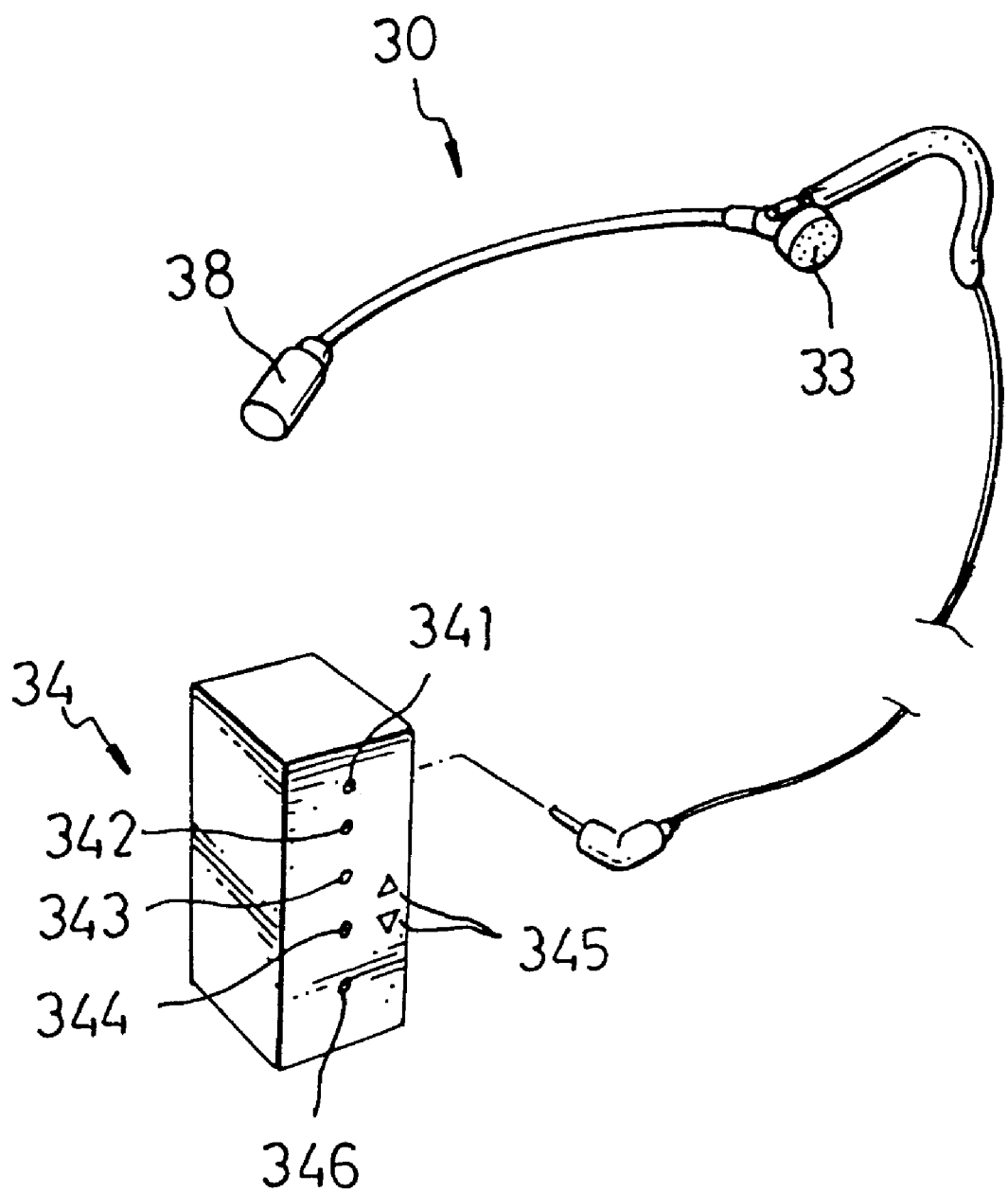
FIG. 3 shows the outer appearance of a user unit for a wireless intercommunicating system according to the first embodiment of the present invention.

Referring to FIG. 3 and FIG. 1 again, the user unit 30 comprises a receiver 31, an antenna 32, a speaker 33, control buttons 34, a control unit 35, an encoder 36, a transmitter 37, and a microphone 38.

The receiver 31 receives a radio signal from the base unit 10 or other radio broadcast station through the receiving antenna 32, and converts the received radio signal into a A.F. signal for output through the speaker 33.

The control buttons 34 are provided for operation by hand to produce different control signals to the control unit 35. The control unit 35 is comprised of a microprocessor. The control buttons 34 include a listen/stop button 341, a radio control button 342, an auto-dialing control button 343, an auto-answer control button 344, a set of frequency control buttons 345 and a selection control button 346, which are controlled to provide listening, radio, auto-dialing, auto-answer and frequency-adjustment control signals respectively. The selection control button 346 can be set by the user to provide a particularly assigned control signal. For example, when the wireless intercommunicating is connected to a computer 80 through a computer connector 70, the selection control button 346 can be set to control the computer 71. The operation flow of the selection control button 346 is same as the auto-dialing control button 343 (or the auto-answer control button 344).

The control unit 35 controls the internal operation of the user unit 30, and receives control signals from the control buttons 34. When the radio control button 342 is pressed on, the user unit 30 is operated as a radio, and the frequency control buttons 345 are operated to select the desired radio broadcast station. When a listening, auto-dialing or auto-answer control signal is received, the control signal is sent to the encoder 36, and then sent by the transmitter 37 to the base unit 10 by radio signal. When the microphone 38 is turned on for communication, the A.F. signal from the user is sent by the antenna 32 to the base unit 10.

Figure 4:
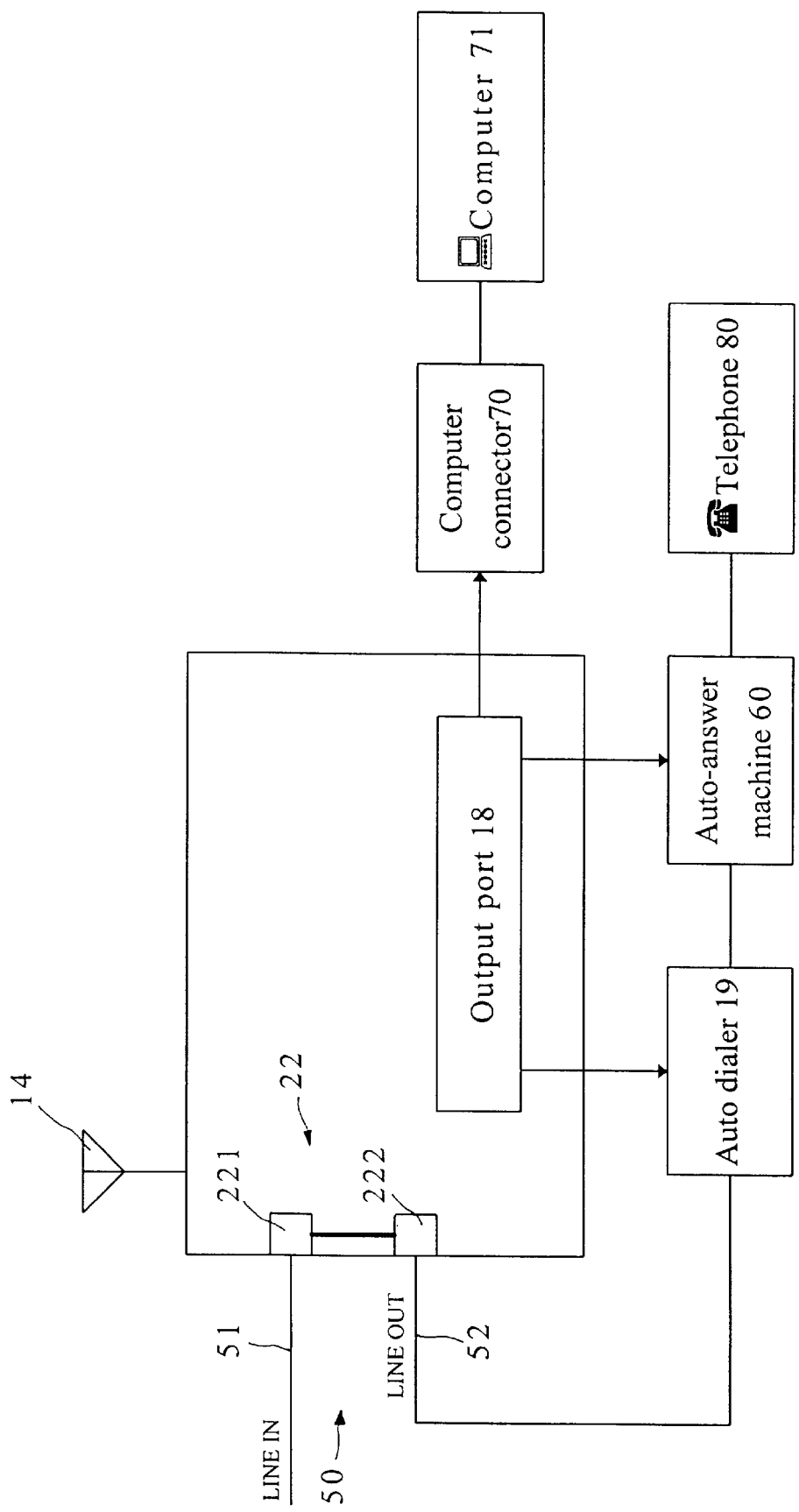
FIG. 4 illustrates the structural arrangement of the base unit according to the first embodiment of the present invention.

Referring to FIG. 2 and FIG. 4 again, the base unit 10 comprises a power management circuit 11, a speech network circuit 12, a transmitter 13, an antenna 14, a receiver 15, a decoder 16, a control unit 17, an output port 18, and a telephone connector set 22.

The power management circuit 11 manages power supply of the base unit 10. The power management circuit 11 comprises a power indicator 20 which indicates the power supply condition of the base unit 10.

The speech network circuit 12 is obtained for example from TEA1062 chip, and connected to line in 51 and line out 52 of a telephone line system 50 through input terminal 221 and output terminal 222 of the telephone connector set 22. for voice input and output. When an incoming A.F. signal comes from line in 51 of the telephone line system 50, it is transmitted by the speech network circuit 12 to the transmitter 13 through the input terminal 221 of the telephone connector set 22, or an outgoing A.F. signal comes from the receiver 15, it is sent by the speech network circuit 12 to line in 51 of the telephone line system 50 through the input terminal 221.

The transmitter 13 can receive a A.F. signal from the speech network circuit 12, enabling the received A.F. signal to be sent through the antenna 14 to the user unit 30 by radio signal.

The receiver 15 can receive a radio signal from the user unit 30. If the received radio signal is a A.F. signal, it is directly sent to the speech network circuit 12, and then outputted from the speech network circuit 12 to line in 51 of the telephone line system 50. If the received radio signal is a listening, auto-dialing or auto-answer control signal, the control signal is decoded by the decoder 16, and then sent to the base unit 10 for recognition by the control unit 17 of the base unit 10. When recognized, the control unit 17 of the base unit 10 controls the transmitter 13 and the receiver 15 to transmit or receive signal, or outputs an auto dialing control signal (or auto-answer control signal) to the output port 18 subject to the nature of the control signal received.

The output port 18 outputs the control signal of the control unit 17 of the base unit 10 to external peripheral apparatus. According to the first embodiment of the present invention, an auto-dialer 19 and, an auto-answer machine 60 are respectively connected to the output port 18. The auto-dialer 19 and the auto-answer machine 60 are connected in series to line out 52 of the telephone line system 50.

Figure 5:
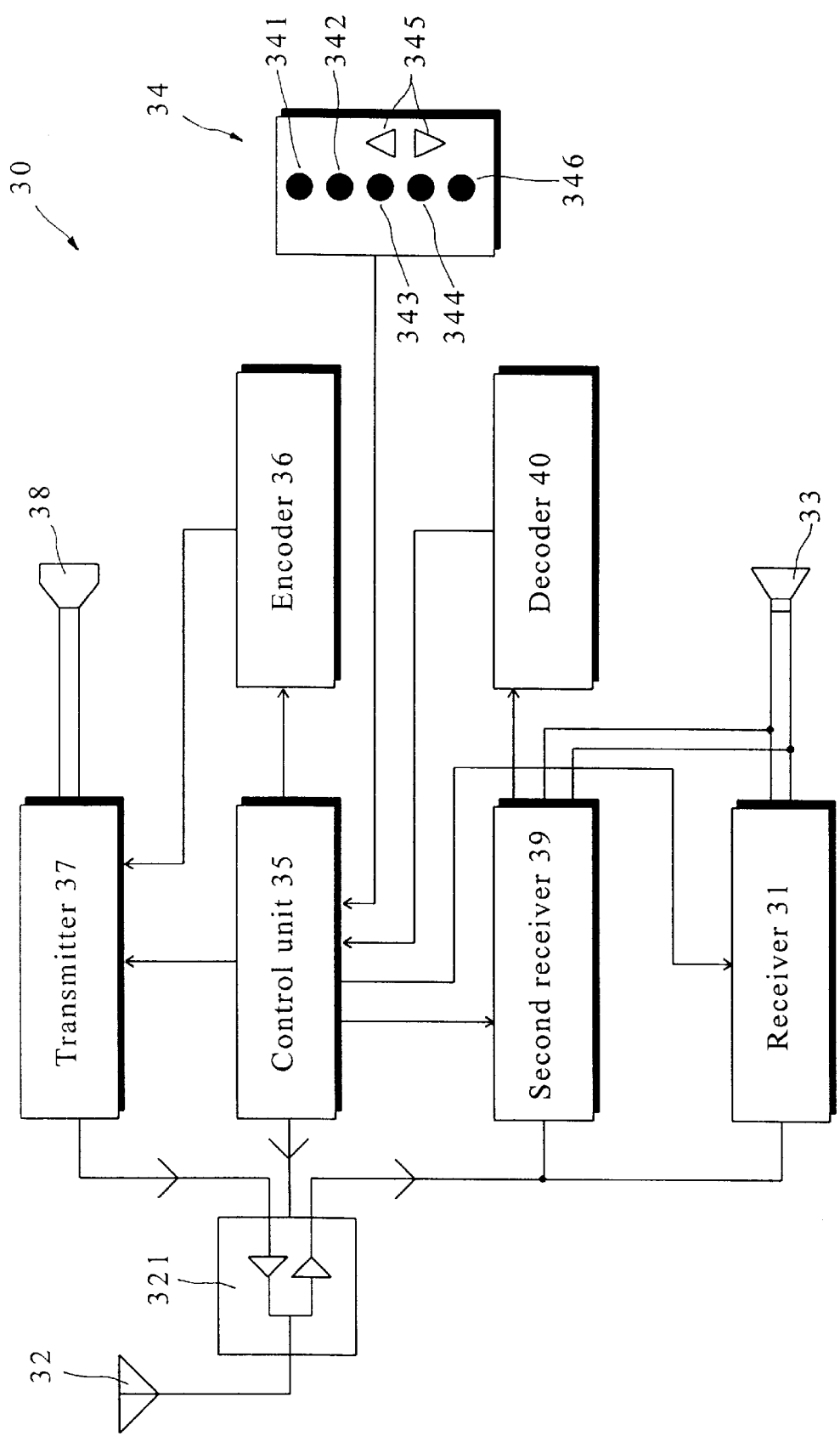
FIG. 5 illustrates the circuit architecture of a user unit for a wireless intercommunicating system according to the second embodiment of the present invention.
Figure 6:
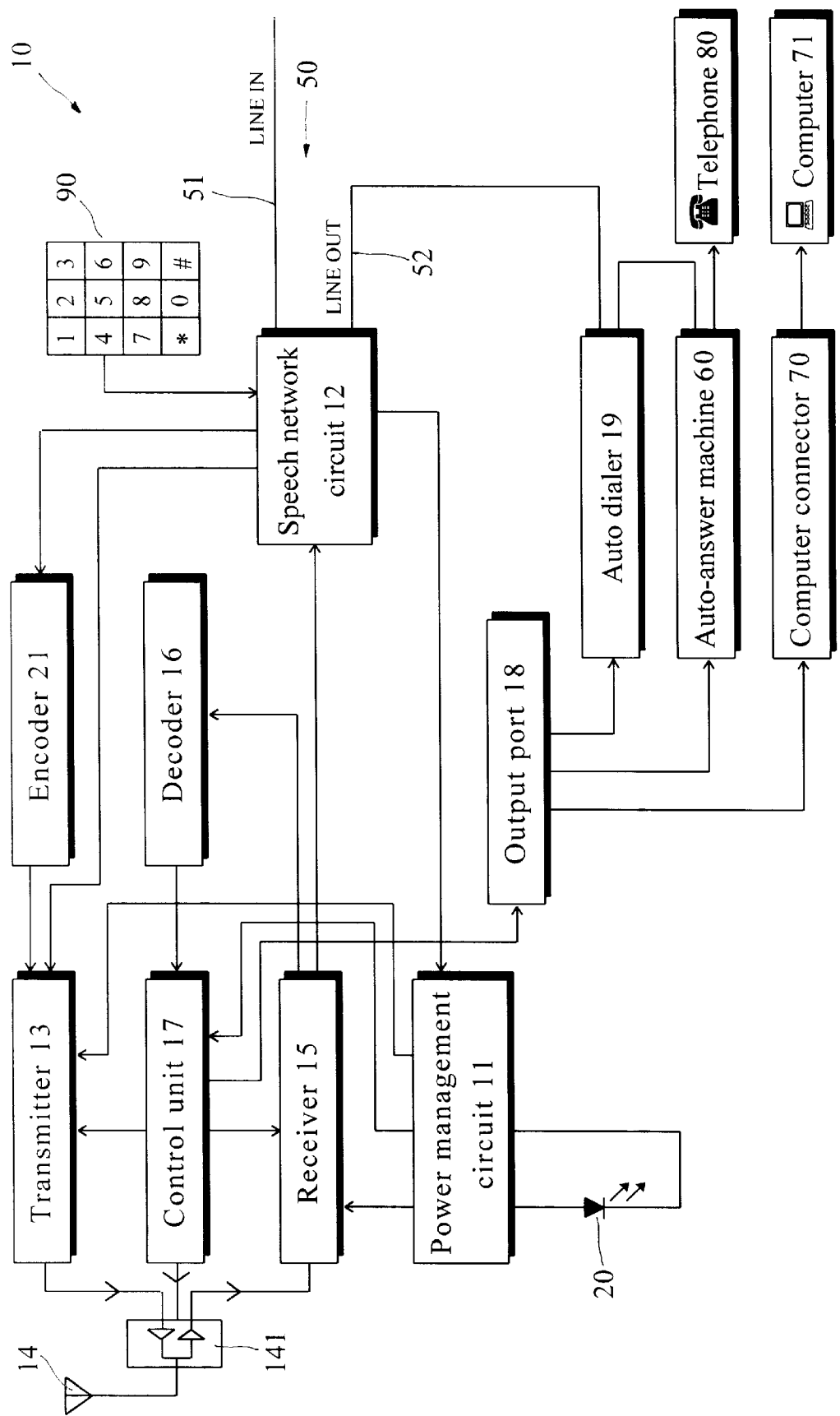
FIG. 6 illustrates the circuit architecture of a base unit for a wireless intercommunicating system according to the first embodiment of the present invention.

FIGS. 5 and 6 show a wireless intercommunicating according to a second embodiment of the present invention. This alternate form is similar to the first embodiment of the present invention with the exception of added means. According to this alternate form, the base unit 10 comprises an encoder 21, the user unit 30 comprises a second receiver 39, and a decoder 40. When an incoming A.F. signal is received, the base unit 10 provides a control signal, enabling the control signal to be encoded by the encoder 21 and then sent to the user unit 30. The control signal from the base unit 10 is received by the second receiver 39 of the user unit 30, then decoded by the decoder 40 of the user unit 30 for recognition, so as to inform the user of the incoming A.F. signal. If an A.F. signal comes from the telephone line system 50 when the user uses the user unit 30 to listen to the broadcasting of a radio broadcast station, the control signal of the base unit 10 automatically cuts off the radio function of the user unit 30, notifying the user of the incoming telephone call.

The speech network circuit 12 can also link with a dialing keypad 90, so that the user can dial the dialing keypad 90 to call out without using the telephone 80.

The receiving/transmitting control circuits 321;141 shown in FIGS. 1;5;2;6 control the antennas 31;14 to receive/transmit signals respectively with minimized power consumption.

The aforesaid transmitters, receivers, power management control circuit, speech network circuit, encoders, decoders, control units, receiving/transmitting control circuits, and dialing keypad are of known devices, therefore the related detailed circuit diagrams are not provided.

It is to be understood that the drawings are designed for purposes of illustration only, and are not intended as a definition of the limits and scope of the invention disclosed. For example, the user unit 30 may be provided with an indicator, or the base unit 10 may be provided with flash light or a buzzer for indication of an incoming telephone.

What is claimed is:

1. A wireless intercommunicating system comprising a base unit connectable to a telephone through a telephone line, and at least one user unit for communication with said base unit by radio signals, said base unit comprising:

(a) a transmitter controlled to transmit radio signals to said at least one user unit, (b) a receiver capable of receiving radio signals from said at least one user unit, (c) a speech network circuit connected to a telephone line for receiving incoming audio frequency signals and outputting outgoing audio frequency signals, said speech network circuit being arranged to transmit inputted audio frequency signals to the transmitter of said base unit for transmission to said at least one user unit by radio, and to receive outgoing audio frequency signals from the receiver of said base unit for transmission to the telephone line, (d) a decoder which recognizes signals received from said at least one user unit through the receiver of said base unit, (e) a control unit which controls operation of the base unit, (f) an output port for output to an external apparatus of control signals provided by the control unit of said base unit, and also for output of control signals received through said at least one user unit through said receiver of said base unit, and (g) telephone connector means connecting said speech network circuit to the telephone line;

said at least one user unit each comprising:

(a) a transmitter controlled to transmit radio signals to said base unit, (b) a receiver which receives radio signals and radio broadcasting signals from radio broadcast stations, (c) a control unit which controls operation of the respective user unit, (d) an encoder which encodes an identification signal, enabling encoded identification signals of the respective user unit to be transmitted to said base unit for recognition, (e) control input buttons for operation by the user to provide a respective control signal to the control unit of the respective user unit, said control input buttons including a radio control button for controlling the respective user unit to receiver the broadcasting of a radio broadcast station, a listen/stop control button for controlling the respective user unit to receive a telephone call or to cut off the line and a selection button for controlling said external apparatus, and (f) microphone and speaker means for voice input/output, enabling the user to talk through a telephone,
    wherein said external apparatus is an auto-dialer connected to the output port of the base unit, and
    wherein said selection button provides a dialing control signal which is transmitted through the transmitter of the user unit to the receiver of the base unit, and which is then output through said output port to activate said auto-dialer.

2. The wireless intercommunicating system of claim 1 wherein said selection button is controlled to provide an auto-answer control signal to said base unit through the transmitter of the respective user unit, causing said base unit to start an auto-answer machine connected thereto.

3. The wireless intercommunicating system of claim 1 wherein said base unit further comprises an encoder and said at least one user unit each further comprises a decoder and a second receiver, so that said base unit outputs a control signal to the assigned user unit through the encoder of said base unit when said base unit receives a telephone message, enabling the encoded control signal to be received by the second receiver of the assigned user unit and decoded by the decoder of the assigned user unit to inform the user of the assigned user unit of the incoming of the telephone message.

4. The wireless intercommunicating system of claim 3 wherein the control signal which is received by the assigned user unit from said base unit when said base unit receives a telephone message automatically cuts off the radio function of the assigned user unit when the assigned user unit is receiving the broadcasting of a radio broadcast station.

5. The wireless intercommunicating system of claim 1 wherein said base unit further comprises a dialing keypad.

* * * * *